US011974210B2

(12) United States Patent
Mansuy et al.

(10) Patent No.: US 11,974,210 B2
(45) Date of Patent: Apr. 30, 2024

(54) PLANNING AN INSTANT FOR TRANSMITTING A MESSAGE OVER A BROADCASTING CHANNEL

(71) Applicant: SIGFOX, Labege (FR)

(72) Inventors: Arnaud Mansuy, Toulouse (FR); Juan Carlos Zuniga, Montreal (CA)

(73) Assignee: UNABIZ, Labege (FR)

( * ) Notice: Subject to any disclaimer, the term of this patent is extended or adjusted under 35 U.S.C. 154(b) by 264 days.

(21) Appl. No.: 17/598,153

(22) PCT Filed: Apr. 16, 2020

(86) PCT No.: PCT/EP2020/060702
§ 371 (c)(1),
(2) Date: Sep. 24, 2021

(87) PCT Pub. No.: WO2020/212485
PCT Pub. Date: Oct. 22, 2020

(65) Prior Publication Data
US 2022/0182922 A1    Jun. 9, 2022

(30) Foreign Application Priority Data
Apr. 18, 2019  (FR) ..................... 19 04162

(51) Int. Cl.
*H04W 48/10*    (2009.01)
(52) U.S. Cl.
CPC .................. *H04W 48/10* (2013.01)
(58) Field of Classification Search
CPC ..... H04W 48/10; H04W 60/02; H04W 76/28; H04W 48/12; Y02D 30/70
See application file for complete search history.

(56) References Cited

U.S. PATENT DOCUMENTS

2006/0133404 A1*  6/2006  Zuniga .............. H04W 72/0446
                                                              370/465
2015/0359000 A1* 12/2015  Li .......................... H04W 74/06
                                                              370/329
(Continued)

FOREIGN PATENT DOCUMENTS

| JP | 2014049834 A | 3/2014 |
|----|--------------|--------|
| JP | 2015502111 A | 1/2015 |
| WO | 2013078303 A1 | 5/2013 |

OTHER PUBLICATIONS

Galini Tsoukaneri et al., "On Device Grouping for Efficient Multicast Communications in Narrowband-IoT," 2018 IEEE 38th International Conference on Distributed Computing Systems (ICDCS), Jul. 2, 2018, pp. 1442-1447.

(Continued)

*Primary Examiner* — Kenneth T Lam
(74) *Attorney, Agent, or Firm* — H&I PARTNERS; C. Andrew Im; Chai Im

(57) ABSTRACT

A method for transmitting a broadcasting message by an access network intended for a group of terminals. The terminals are configured to recurrently and asynchronously transmit polling messages intended for the access network. An instant for transmitting the broadcasting message is determined on the basis of information relating to the recurrence of the polling messages transmitted by the terminals of the group. Before transmitting the broadcasting message and for each polling message received from a terminal of the group, a response message including one or more parameters relating to the transmission of the broadcasting message is transmitted. The response message needs to be received by the terminal during a listening window with a predetermined duration following the transmission of the polling message. The broadcasting message is transmit-
(Continued)

ted over the broadcasting channel at the determined transmission instant.

13 Claims, 3 Drawing Sheets

(56) References Cited

U.S. PATENT DOCUMENTS

| | | |
|---|---|---|
| 2016/0323820 A1 | 11/2016 | Wong et al. |
| 2016/0345324 A1* | 11/2016 | Shu .................. H04W 72/0453 |
| 2016/0381702 A1 | 12/2016 | Jeong et al. |
| 2017/0142705 A1* | 5/2017 | Chendamarai Kannan .................. H04W 72/21 |
| 2018/0049133 A1 | 2/2018 | Park et al. |
| 2018/0070333 A1 | 3/2018 | Ponsard et al. |
| 2018/0103427 A1 | 4/2018 | Griot et al. |
| 2019/0306880 A1* | 10/2019 | Ribeiro Blard ..... H04W 52/265 |
| 2020/0187694 A1* | 6/2020 | Santangeli ......... G07C 9/00309 |

OTHER PUBLICATIONS

Mattia Rizzi et al., "Synchronization Uncertainty Versus Power Efficiency in LoRaWAN Networks," IEEE Trans. Instrumentation and Measurement, Apr. 1, 2019, pp. 1101-1111, vol. 68, No. 4, IEEE Services Center, NJ, USA.

Galini Tsoukaneri et al., "Group Communications in Narrowband-IoT: Architecture, Procedures, and Evaluation," IEEE Internet of Things Journal, Jun. 1, 2018, pp. 1539-1549, vol. 5, No. 3, IEEE, USA.

* cited by examiner

PLANNING AN INSTANT FOR TRANSMITTING A MESSAGE OVER A BROADCASTING CHANNEL

RELATED APPLICATIONS

This application is a § 371 application of PCT/EP2020/060702 filed Apr. 16, 2020, which claims priority from French Patent Application No. 19 04162 filed Apr. 18, 2019, each of which is incorporated herein by reference in its entirety.

TECHNICAL FIELD

The present invention belongs to the field of wireless communication systems, and more particularly relates to a method for transmitting, by an access method, a message over a broadcasting channel to a group of terminals.

BACKGROUND OF THE INVENTION

The present invention is particularly advantageously applicable, although in no way limited, to wireless communications systems implemented for M2M (Machine-to-Machine) or IoT (Internet of Things) type applications.

In such wireless communication systems, the exchanges of messages are essentially unidirectional, in this case on an uplink between terminals and an access network of said system.

The terminals transmit messages on the uplink that are collected by base stations of the access network, preferably without having to previously associate themselves with one or more base stations of the access network. In other terms, the messages transmitted by a terminal on the uplink are not intended for one specific base station of the access network, and the terminal transmits its messages by assuming that they will be able to be received by at least one base station. Such arrangements are advantageous in that the terminal does not need to perform regular measurements, which are intensive particularly from a power consumption point of view, in order to determine the most suitable base station to receive its messages. The complexity is on the access network, which must be capable of receiving uplink messages that can be transmitted at arbitrary instants and on arbitrary center frequencies.

Such an operating mode, wherein the exchanges of messages are essentially unidirectional, is entirely satisfactory for many applications, such as for example the remote reading of gas, water, electricity meters, the remote surveillance of buildings or houses, etc.

In some applications however, it may be advantageous to also be able to carry out exchanges of messages in the other direction, namely on a downlink from the access network to the terminals.

In particular, it may be advantageous to transmit messages over a broadcast or multicast channel to terminals. In particular, the transmission of messages over a broadcasting channel may be implemented to carry out updates of software used by a group of terminals, the group of terminals may be all of the terminals (broadcast channel) or only a proportion of said terminals (multicast channel).

In a wireless communication system for M2M and/or IoT applications, the power consumption of terminals must often be reduced as much as possible, in particular when they are operated on batteries.

To limit the power consumption of terminals, it is known to transmit a downlink message, to a terminal, during a predetermined listening window in relation to an uplink message transmitted by said terminal. More particularly, after having transmitted an uplink message, a terminal switches into a standby (or energy saving) mode over a standby window of predetermined duration. At the end of said standby window, the terminal exits the standby mode to listen to the downlink over a listening window of limited duration, in expectation of a downlink message transmitted by a base station.

As far as the access network is concerned, the listening windows of the various terminals may be determined on the basis of uplink messages received from these terminals, and the access network must organize the transmission of downlink messages so that they are able to be received, by the corresponding terminals, during the respective listening windows of said terminals.

Due to the fact that the terminals only listen to the downlink over predetermined listening windows, the additional power consumption required for receiving downlink messages is limited, and said terminals may often be in standby mode. Furthermore, due to the fact that they must not transmit and receive simultaneously, such terminals may be half-duplex, and may therefore be inexpensive to manufacture.

With such arrangements, the terminals are not however adapted to listen to messages transmitted conventionally by the access network over a broadcasting channel. Indeed, to receive messages transmitted over a broadcasting channel, a terminal must generally listen permanently, or at least recurrently, to said broadcasting channel.

In such a wireless communication system, it is also not uncommon to implement half-duplex type base stations, in order to limit the cost of manufacture of said base stations, and more generally of the access network. Yet, a base station that transmits a message over a broadcasting channel on the downlink is not available to receive messages transmitted on the uplink. Consequently, it may be desirable to optimize the planning of a broadcasting channel in the aim of limiting the unavailability time of a base station for receiving messages on the uplink.

Finally, in such a wireless communication system, the bandwidth is generally very limited and the size of the messages exchanged between the access network and the terminals should be reduced as much as possible. However, the existing methods for allocating a broadcasting channel to a group of terminals does not take this constraint into account.

OBJECT AND SUMMARY OF THE INVENTION

The aim of the invention is to remedy all or part of the limitations of the solutions of the prior art, particularly those disclosed above.

To this end, and according to a first aspect, the invention relates to a method for transmitting at least one message, known as "broadcasting message", by an access network of a wireless communication system. Said message is transmitted over a broadcasting channel to a group of terminals of said wireless communication system. The terminals are configured to transmit messages, known as "polling messages", on an uplink to the access network in a recurrent manner and asynchronously with respect to the access network.

The method includes:
determining, by the access network, an instant for transmitting the broadcasting message based on information relating to the recurrence of polling messages transmitted by the terminals of said group, before transmitting the broadcasting message, transmitting, by the access network, in response to each polling message received from a terminal belonging to said group, on a point-to-point connection to said terminal, a message, known as "response message", including one or more parameters relating to the transmission of the broadcasting message, said response message being transmitted such as to be received by said terminal during a listening window with a predetermined duration following the transmission of the polling message, transmitting, by said access network, the broadcasting message over the broadcasting channel at the determined instant for transmitting.

The polling messages are asynchronously transmitted in relation to the access network. This means that the polling messages are transmitted at arbitrary instants for the access network, or in other words said access network does not necessarily know how to determine at which moment a polling message may be transmitted by a terminal. This particularly means that a polling message is not transmitted in response to a triggering event from the access network. For a specific terminal, the access network knows for example only a maximum time interval separating two polling messages successively transmitted by the terminal (it should be noted that this information may be known a priori by the access network, or it may be estimated by the access network depending on the messages previously received from said terminal).

A message transmitted over the broadcasting channel is transmitted by the access network to all of the terminals of the group. On the other hand, a message transmitted on a point-to-point connection between the access network and a terminal is only transmitted to said terminal.

Such arrangements make it possible to optimize the planning of a broadcasting channel whilst respecting the constraint according to which the terminals listen to a downlink during a predetermined listening window after transmitting a message on an uplink. Indeed, the instant for transmitting the broadcasting message over the broadcasting channel may be determined such as to make sure that all of the terminals of the group were able to be configured to receive said broadcasting message, that is to say all of the terminals of the group had an opportunity to receive, via the response messages, the information necessary for receiving the broadcasting message, such as for example information relating to the instant for transmitting said broadcasting message.

It should be noted that a broadcast or multicast may include a plurality of broadcasting messages that are transmitted sequentially to terminals of the group. In such a case, the access network determines the instant for transmitting the first message of the set of messages to be broadcast. The instant for transmitting the first message of the set of messages to be broadcast may subsequently be communicated to various terminals of the group in the response messages.

In specific implementations, the transmission method may further include one or more of the following features, taken alone or according to any possible technical combinations.

In specific implementations, a response message transmitted to a terminal of the group includes one or more parameters from the following parameters:

information relating to the instant for transmitting the broadcasting message, a group identifier dynamically assigned by the access network, a center frequency of the broadcasting channel, when a plurality of broadcasting messages must be broadcast sequentially, a sequence number of a first broadcasting message, and/or a sequence number of a last broadcasting message, and/or a number of broadcasting messages.

The fact of dynamically assigning a group identifier makes it possible to limit the size of the messages exchanged between the access network and the terminals. Indeed, in the conventional broadcast or multicast methods, group identifiers are defined statically a priori. In this case a sufficiently large size should be selected to encode the value of the group identifier in order to make sure that the maximum number of different group identifiers that may be defined is sufficient. However, it is not easy to plan at a given instant the number of group identifiers that will be necessary to support in the future. On the contrary, by dynamically assigning a group identifier, the access network may reuse group identifiers that have already been used in the past for other broadcasting channels, but that are not currently used. The size of the parameter that encodes the value of the group identifier may then be defined optimally depending on the maximum number of broadcasting channels that are likely to exist simultaneously at a given instant and in a given geographic area, and not depending on the total number of broadcasting channels that it is necessary to support for the communication system 10. Such arrangements make it possible to reduce the size of the parameter that encodes a group identifier value, and thus to limit the size of the response message that includes the group identifier.

The fact of dynamically assigning a group identifier also makes it possible to avoid having to store in memory a predefined list of group identifiers at the access network and terminals.

When a plurality of broadcasting messages must be broadcast sequentially, the fact of communicating to terminals of the group a sequence number of the first broadcasting message, and/or a sequence number of the last broadcasting message, and/or a number of broadcasting messages makes it possible to further optimize the use of resources for the broadcasting channel.

In specific implementations, information relating to the recurrence of the polling messages transmitted by the terminals of the group is a maximum time interval separating two polling messages transmitted by a terminal of the group.

In specific implementations, determining an instant for transmitting the broadcasting message includes determining a minimum waiting period for receiving at least one polling message coming from each terminal of the group. The instant for transmitting the broadcasting message is determined to be after the expiry of said minimum waiting period.

In specific implementations, the method further includes selecting, by the access network, a set of base stations of the access network contributing to the transmission of the broadcasting message, depending on the polling messages received by the terminals of the group.

In specific implementations, a base station of the access network is selected to transmit the broadcasting message only if said base station has received a number of polling messages coming from terminals of the group higher than a predetermined threshold.

Such arrangements also make it possible to optimize the planning of broadcasting channels and the use of radio resources by the access network.

According to a second aspect, the invention relates to an access network of a wireless communication system. The access network includes a plurality of base stations adapted to exchange messages with terminals of said wireless communication system. Said terminals are configured to transmit messages, known as "polling messages", on an uplink to the access network in a recurrent manner and asynchronously with respect to the access network. The access network is configured to transmit at least one message, known as "broadcasting message" to a group of terminals over a broadcasting channel. The access network is further configured to:
- determine an instant for transmitting the broadcasting message based on information relating to the recurrence of polling messages transmitted by the terminals of said group,
- before transmitting the broadcasting message, transmit, in response to each polling message received from a terminal belonging to said group, on a point-to-point connection to said terminal, a message, known as "response message", including one or more parameters relating to the transmission of the broadcasting message, said response message being transmitted such as to be received by said terminal during a listening window with a predetermined duration following the transmission of the polling message,
- transmit the broadcasting message over the broadcasting channel at the determined instant for transmitting.

In specific embodiments, the access network may further include one or more of the following features, taken alone or according to any possible technical combinations.

In specific embodiments, the response message transmitted to a terminal of the group includes one or more parameters from the following parameters:
- information relating to the instant for transmitting the broadcasting message,
- a group identifier dynamically assigned by the access network (30),
- a center frequency of the broadcasting channel,
- when a plurality of broadcasting messages must be broadcast sequentially, a sequence number of a first broadcasting message, and/or a sequence number of a last broadcasting message, and/or a number of broadcasting messages.

In specific embodiments, the instant for transmitting the broadcasting message is determined depending on a minimum waiting period necessary for receiving at least one polling message coming from each terminal of the group.

In specific embodiments, the access network is further configured to select a set of base stations of the access network contributing to the transmission of the broadcasting message, depending on the polling messages received by the terminals of the group.

According to a third aspect, the invention relates to a terminal of a wireless communication system including an access network. The access network includes a plurality of base stations adapted to exchange messages with said terminal. The terminal is configured to transmit a message, known as "polling message", on an uplink to the access network in a recurrent manner and asynchronously with respect to the access network. The access network is configured to transmit at least one message, known as "broadcasting message", over a broadcasting channel, to a group of terminals to which said terminal belongs. The terminal is configured to receive on a point-to-point connection between the access network and the terminal, a message, known as "response message", including information relating to the instant for transmitting said broadcasting message and/or, when a plurality of broadcasting messages must be broadcast sequentially, information making it possible to determine a set of sequence numbers intended for the terminal. The response message is received by said terminal in response to said polling message during a listening window with a predetermined duration following the transmission of the polling message.

In specific embodiments, the terminal may further include one or more of the following features, taken alone or according to any possible technical combinations.

In specific embodiments, the response message includes information relating to the instant for transmitting said at least one broadcasting message, and the terminal is configured to start listening to the broadcasting channel in order to receive the broadcasting message or messages on the basis of said instant for transmitting.

In specific embodiments, a plurality of broadcasting messages must be transmitted sequentially over the broadcasting channel and each message includes a sequence number. The response message includes information making it possible to determine a set of sequence numbers intended for the terminal. The terminal is configured to consider only the broadcasting messages the sequence number of which is included in the set of sequence numbers intended for the terminal. The terminal is configured to ignore the other broadcasting messages for which the sequence number is not included in the set of sequence numbers intended for the terminal.

BRIEF DESCRIPTION OF THE FIGURES

The invention will be better understood upon reading the following description, given by way of non-limiting example, and made in reference to the figures that show.

In said figures, identical references from one figure to another designate identical or similar elements. For reasons of clarity, the elements shown are not to scale, unless otherwise specified.

DETAILED DESCRIPTION OF EMBODIMENTS

Figure 1:
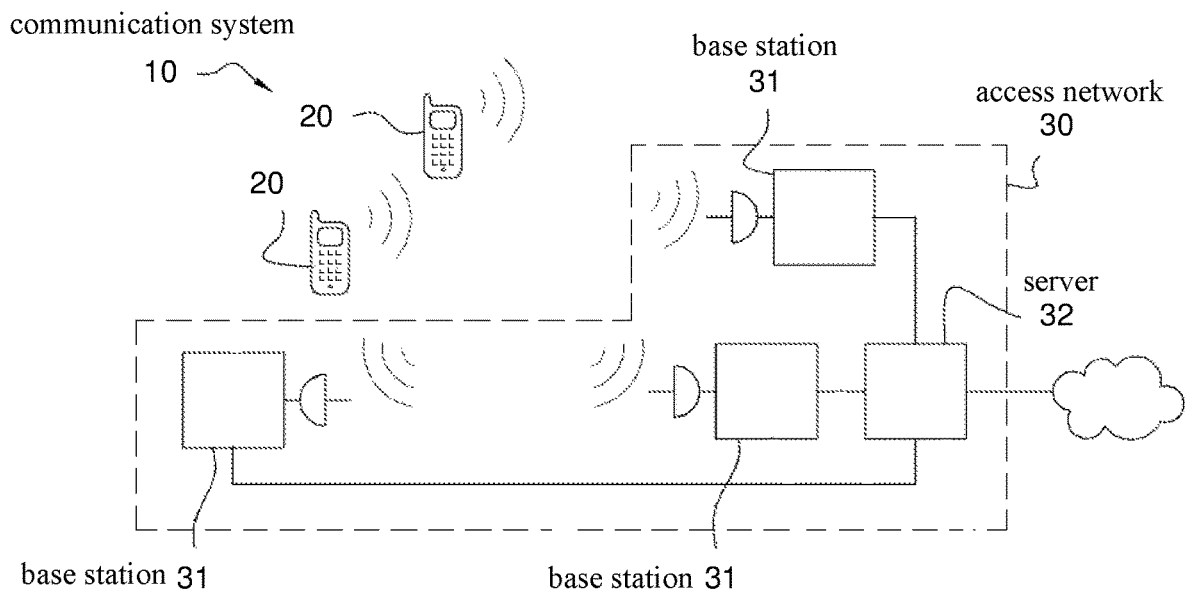
FIG. 1 is a schematic representation of a wireless communication system.

FIG. 1 schematically shows a wireless communication system 10 including a plurality of terminals 20 and an access network 30 including a plurality of base stations 31.

The terminals 20 and the base stations 31 of the access network 30 exchange messages in the form of radioelectric signals. "Radioelectric signal" means an electromagnetic wave propagating via wireless means, the frequencies of which are within the traditional spectrum of radioelectric waves (a few hertz to a plurality of hundreds of gigahertz).

In the remainder of the description, by way of example and in a non-limiting manner, we place ourselves in the case of a wireless communication system of the LPWAN (Low Power Wide Area Network) type. Such a wireless communication system is a low power wide area access network the rates of which are generally less than 1 Mbit/s. Such UNB wireless communication systems are particularly adapted to applications of the IoT type.

In specific implementations, the wireless communication system 10 may be an ultra narrow band communication system. "Ultra Narrow Band" or UNB means that the instantaneous frequency spectrum of the radio signals transmitted by the terminals is of frequency width less than two kilohertz, or even less than one kilohertz. Such a system makes it possible to significantly limit the power consumption of terminals when they communicate with the access network.

The terminals 20 are adapted to transmit messages on an uplink to the access network 30.

Each base station 31 is adapted to receive the messages transmitted by terminals 20 that are within its range. Each message thus received is for example transmitted to a server 32 of the access network 30, optionally accompanied with other information such as an identifier of the base station 31 that received it, the measured power of said received message, the date of receipt and/or the measured center frequency of said received message, etc. The server 32 processes for example all of the messages received from the various base stations 31.

Furthermore, the access network 30 is also adapted to transmit, by means of the base stations 31, messages on a downlink to terminals 20, which are adapted to receive them. A message may be transmitted on the downlink on a point-to-point connection, that is to say to a single specific terminal 20, indicated as recipient in the message.

A downlink message transmitted by the access network 30 on a point-to-point connection to a terminal 20 is received by the terminal 20 during a predetermined listening window in relation to an uplink message previously transmitted by said terminal 20. More particularly, in the example considered, after having transmitted an uplink message, a terminal switches into a standby (or energy saving) mode over a standby window of predetermined duration. At the end of said standby window, the terminal exits the standby mode to listen to the downlink over a listening window of limited duration, in expectation of a downlink message transmitted by a base station.

As far as the access network 30 is concerned, the listening windows of the various terminals may be determined on the basis of uplink messages received from these terminals, and the access network must organize the transmission of downlink messages so that they are able to be received, by the corresponding terminals, during the respective listening windows of said terminals.

Due to the fact that the terminals only listen to the downlink over predetermined listening windows, the additional power consumption required for receiving downlink messages is limited, and said terminal may often be in standby mode.

A message may also be transmitted over a broadcasting channel to a group of terminals 20, identified by a group identifier indicated as recipient in the message. The broadcasting channel may be a broadcast channel, in which case the group of terminals 20 corresponds to all of the terminals 20 of the wireless communication system 10. The broadcasting channel may be a multicast channel, in which case the group of terminals 20 corresponds to only a proportion of all of the terminals 20 of the wireless communication system 10.

Figure 2:
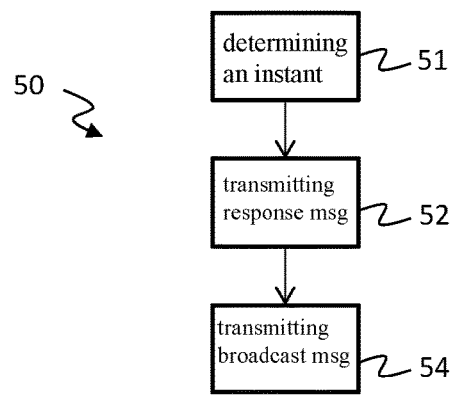
FIG. 2 is a diagram illustrating the main steps of a method for transmitting messages by an access network.

FIG. 2 shows the main steps of a method 50 for transmitting, by an access network 30, at least one broadcasting message to a group of terminals 20 of the wireless communication system 10. The terminals 20 are configured to recurrently transmit polling messages on an uplink to the access network. The method 50 includes the following steps:

a step of determining 51 an instant for transmitting the broadcasting message on the basis of information relating to the recurrence of polling messages transmitted by the terminals 20 of said group, before transmitting the broadcasting message, transmitting 52, by the access network 30, in response to each polling message received from a terminal 20 belonging to said group, on a point-to-point connection to said terminal 20, a response message including one or more parameters relating to the transmission of the broadcasting message, said response message being destined to be received by said terminal 20 during a listening window with a predetermined duration following the transmission of the polling message, transmitting 54, by said access network 30, the broadcasting message over the broadcasting channel at the determined instant for transmitting.

It should be noted that the various steps illustrated by FIG. 2 are executed by the access network 30, in this case by at least one base station 31 of the access network 30, and optionally by the server 32.

To this end, each base station 31 and the server 32 include for example a processing circuit (not shown in the figures), including for example one or more processors and memory storage means (magnetic hard drive, electronic memory, optical disc, etc.) wherein is stored in memory a computer program product, in the form of a set of program code instructions to be executed to implement the steps of the transmission method 50. Alternatively or in addition, the processing circuit includes one or more programmable logic circuits (FPGA, PLD, etc.), and/or one or more specialized integrated circuits (ASIC), and/or a set of discrete electronic components, etc., adapted to implement all or part of said steps.

Each base station 31 further includes a radioelectric circuit (not shown in the figures) including equipment (antenna, amplifier, local oscillator, mixer, analogue filter, etc.) known by a person skilled in the art, making it possible for said base station 31 to transmit and to receive messages in the form of radioelectric signals.

In other terms, the processing circuits and the radioelectric circuits of the base stations 31 and of the server 32 correspond to means of the access network 30 that are configured by software (specific computer program product) and/or hardware (FPGA, PLD, ASIC, discrete electronic components, etc.) to implement the steps of the transmission method 50.

At the determination step 51, the instant for transmitting the broadcasting message over the broadcasting channel may be determined such as to make sure that all of the terminals 20 of the group were able to be configured to receive said broadcasting message, that is to say all of the terminals of the group had an opportunity to receive, via the response messages, the information necessary for receiving the broadcasting message, such as for example information relating to the instant for transmitting said broadcasting message.

In one variant, the instant for transmitting the broadcasting message over the broadcasting channel may be determined such as to make sure that at least one predetermined minimum number of terminals 20 of the group has been configured to received said broadcasting message.

The instant for transmitting the broadcasting message is determined on the basis of information relating to the recurrence of polling messages transmitted by the terminals 20 of the group. This information may for example correspond to a period for transmitting a common polling message to all of the terminals of the group. According to another example, this information may correspond to the maximum transmission period for all of the terminals of the group if various terminals may have different periods for transmitting a polling message. According to yet another example, this information may correspond to a maximum time interval separating two polling messages transmitted by a terminal of the group, particularly if the polling messages are not transmitted periodically by the terminals.

In a specific implementation, the step of determining 51 an instant for transmitting the broadcasting message includes determining a minimum waiting period for receiving at least one polling message coming from each terminal 20 of the group, and the instant for transmitting the broadcasting message is determined to be after the expiry of said minimum waiting period. Such arrangements may particularly make it possible to make sure that all of the terminals of the group were able to transmit a polling message and receive in return a response message including the information necessary for receiving the broadcasting message before said broadcasting message is transmitted.

It should be noted that a polling message transmitted by a terminal 20 may be transmitted to explicitly poll the access network 30 relating to the possible broadcasting of a broadcasting message for the attention of said terminal. However, nothing prevents the polling message from including data for the attention of the access network 30 without including explicit requests relating to the possible broadcasting of a broadcasting message for the attention of said terminal. The access network may however take advantage of the fact that the terminal 20 will remain in listening on a downlink during a predetermined listening window to send to it a response message indicating to the terminal 20 that a broadcasting message will soon be transmitted for a group of terminals to which said terminal belongs.

The response message transmitted at the transmission step 52 may include one or more parameters making it possible to configure a terminal 20 of the group to receive the broadcasting message.

The response message may particularly include information relating to the instant for transmitting the broadcasting message, or if a plurality of broadcasting messages must be transmitted, relating to the instant for transmitting a first broadcasting message. A terminal 20 of the group may then advantageously remain in standby, without listening to the broadcasting channel, during a certain period until the instant for transmitting the first broadcasting message. The terminal 20 only starts to listen to the broadcasting channel as from the instant for transmitting the first broadcasting message. Such arrangements make it possible to reduce the power consumption of the terminal 20.

The response message may also include a centre frequency of the broadcasting channel at which the broadcasting message or messages will be transmitted.

The response message may also include a group identifier dynamically assigned by the access network 30. "Dynamic assignment" means that a group identifier is not defined statically a priori and stored in memory by the access network 30 and the terminals 20. In other words, whenever a broadcasting channel must be created, a group identifier is determined by the access network 30 for said broadcasting channel. The access network may reuse group identifiers that have already been used in the past for other broadcasting channels, but that are not currently used. The size of the parameter that encodes the group identifier may then depend on the number of broadcasting channels (that is to say the number of different group identifiers) that may coexist at the moment where the broadcasting channel is created and in the geographic area where the broadcasting channel is used. Such arrangements make it possible to reduce the size of the parameter that encodes a group identifier value, and thus to limit the size of the response message that includes the group identifier. For example, the group identifier may be encoded over eight bits, which means that 256 different group identifiers, and therefore 256 different broadcasting channels, may be created simultaneously in a given geographic area.

A broadcast or multicast may include a plurality of broadcasting messages that are transmitted sequentially over the broadcasting channel to terminals of the group. In such a case, it may also be advantageous that the response message includes information making it possible to determine a set of sequence numbers intended for a terminal 20 of the group, such as for example a sequence number of the first broadcasting message, and/or a sequence number of the last broadcasting message, and/or a number of broadcasting messages. This makes it possible to further optimize the use of resources for the broadcasting channel. Indeed, it then becomes possible to define, for the same broadcasting channel, that is to say for the same group identifier, a plurality of subgroups of terminals for which only a proportion of the set of broadcasting messages are intended. For example, if there are ten broadcasting messages, it becomes possible to define a first subgroup of terminals for which the messages the sequence number of which is between one and eight are intended, and a second subgroup of terminals for which the messages the sequence number of which is between four and ten are intended. The ten messages are however only broadcast once by the access network over a single broadcasting channel. Such arrangements are indeed advantageous in relation to creating two broadcasting channels: a first broadcasting channel for broadcasting the messages the sequence number of which is between one and eight to a first subgroup of terminals, and a second broadcasting channel for broadcasting the messages the sequence number of which is between four and ten to the second subgroup of terminals. Indeed, in such a case, fourteen messages would be broadcast instead of ten, and consequently the use of radio resources is not optimized.

In such a case, a terminal 20 may then be configured to only consider the messages the sequence number of which is greater than or equal to a sequence number of a first broadcasting message indicated in the response message received by said terminal 20. The terminal 20 may also be configured to only consider a number of broadcasting messages equal to a number of broadcasting messages indicated in the response message received by the terminal 20. In addition, a terminal 20 may also be configured to only consider the messages the sequence number of which is less than or equal to a sequence number of a last broadcasting message indicated in the response message received by said terminal 20. A broadcasting message is "considered" by the terminal 20 means if said broadcasting message is used by the terminal 20. A broadcasting message the sequence number of which is such that it must not be considered by the terminal 20 is ignored. In other words, a bottom layer (physical layer or connection layer) of the terminal 20 makes the decision to transmit or not a broadcasting message to a top layer (for example an application layer) of the terminal 20 depending on the sequence number of the received message and depending on the sequence numbers expected by the terminal 20. A broadcasting message is only used by the terminal if the sequence number of the broadcasting message is within the sequence numbers expected by the terminal 20.

It should be noted that the response message may include information making it possible to determine a set of sequence numbers intended for a terminal 20 of the group without necessarily including information relating to the instant for transmitting a first broadcasting message over the broadcasting channel. In such a case, a terminal 20 may for example start to listen to the broadcasting channel as soon as it receives a response message from the access network 30 and to ignore all of the messages the sequence number of which is not included in the set of sequence numbers that are intended for it.

At the step of transmitting 54 a broadcasting message by the access network 30, the broadcasting message may be transmitted by one or more base stations 31. In the present description, even if the broadcasting message is transmitted by a plurality of base stations 31, it is considered that this concerns a single transmission of the broadcasting message by the access network 30.

Figure 3:
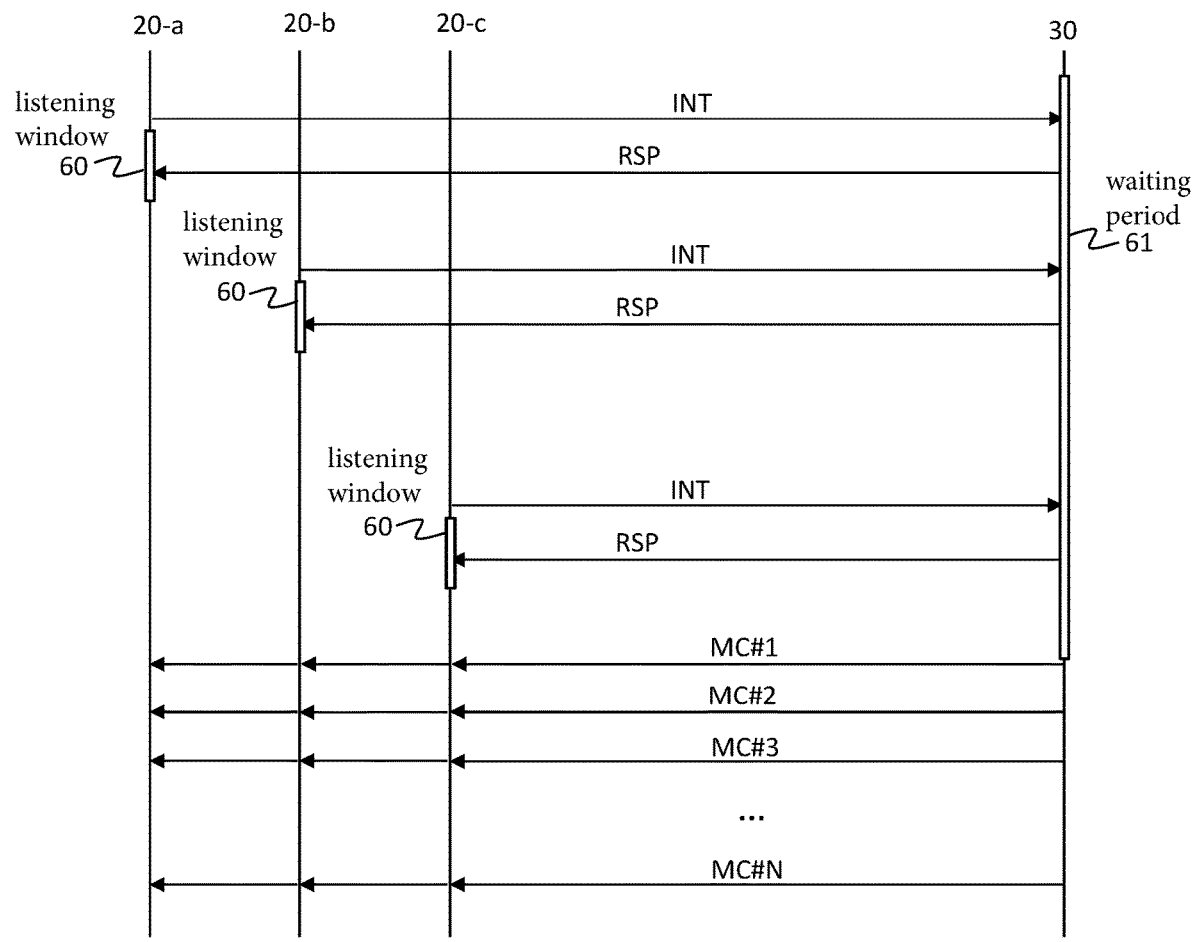
FIG. 3 is a diagram illustrating the exchanges of messages involved in the transmission method according to the invention.

By way of non-limiting example, FIG. 3 schematically shows the messages exchanged between terminals and the access network 30 when N broadcasting messages must be broadcast by the access network 30 over a broadcasting channel to a group of three terminals 20-*a*, 20-*b* and 20-*c*.

The access network 30 determines for example a minimum waiting period 61 to receive at least one polling message INT coming from each terminal 20-*a*, 20-*b*, 20-*c* of the group. This waiting period 61 is for example determined on the basis of a maximum time interval separating two polling messages transmitted by a terminal of the group, the value of this maximum time interval being known a priori by the access network 30. To determine the minimum waiting period 61 necessary, the access network 30 may for example store in memory over time the various instants at which it receives polling messages. An instant for transmitting the first broadcasting message MC #1 is then determined by the access network 30 such as to be after the expiry of the waiting period 61, in order to make sure that all of the terminals 20-*a*, 20-*b*, 20-*c* of the group were able to transmit a polling message INT and receive in return a response message RSP including the information necessary for receiving the broadcasting message before said broadcasting message is transmitted.

For each polling message INT received from a terminal 20-*a*, 20-*b*, 20-*c* of the group during the waiting period 61, the access network transmits a response message RSP to said terminal, on a point-to-point connection, such that said terminal receives said response message during a predetermined listening window 60 that follows the transmission of the polling message INT. Each response message RSP includes information relating to the instant for transmitting the first broadcasting message MC #1, such that each terminal 20-*a*, 20-*b*, 20-*c* knows at which moment it must start to listen to the broadcasting channel. A response message RSP may also include information relating to the number of broadcasting messages, a centre frequency of the broadcasting channel, an existence time of the broadcasting channel, etc. Optionally, if only a proportion of N broadcasting messages are intended for one of the terminals 20-*a*, 20-*b*, 20-*c* of the group, a response message RSP may include a sequence number of a first broadcasting message and/or a sequence number of a last broadcasting message intended for said terminal.

When the instant for transmitting the first broadcasting message MC #1 arrives, the access network starts to sequentially transmit the N broadcasting messages MC #1, MC #2, MC #N over the broadcasting channel. The terminals 20-*a*, 20-*b*, 20-*c* of the group are for their part configured to be listening to the broadcasting channel on the basis of the instant for transmitting the first broadcasting message MC #1.

Figure 4:
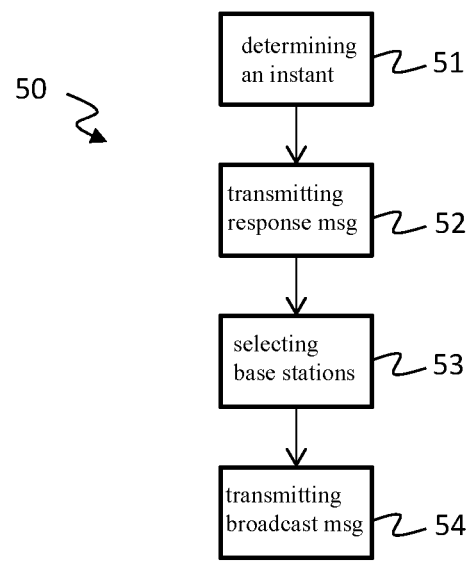
FIG. 4 is a diagram illustrating the main steps of a specific implementation of a method for transmitting messages by an access network.

FIG. 4 schematically shows the main steps of a specific implementation of the transmission method 50. As illustrated in FIG. 4, the transmission method 50 takes all of the steps of FIG. 2.

As illustrated in FIG. 4, the transmission method 50 further includes a step of selecting 53, by the access network 30, a set of base stations 31 of the access network 30 contributing to the transmission 54 of the broadcasting message. This selection is carried out depending on the polling messages received by the terminals 20 of the group.

In the method according to the invention, the access network 30 indeed knows to which terminals 20 of the group the information relating to the broadcasting channel has been sent via a response message. It is therefore possible, for the access network, to select a set of base stations 31 making it possible to cover these terminals that have been configured to receive the broadcasting message. Such arrangements make it possible to optimize the use of radio resources for a broadcasting channel since it is then possible to avoid an unnecessary transmission of a broadcasting message by a base station that does not cover any terminal of the group.

In a specific implementation, a base station 31 of the access network 30 is selected to transmit the broadcasting message only if said base station 31 has received a number of polling messages coming from terminals 20 of the group higher than a predetermined threshold.

The invention claimed is:

1. A method for transmitting at least one broadcasting message, by an access network of a wireless communication system, said at least one broadcasting message being transmitted over a broadcasting channel to a group of terminals of the wireless communication system, the terminals being configured to transmit polling messages on an uplink to the access network in a recurrent manner and asynchronously with respect to the access network, the method comprises:

determining, by the access network, an instant for transmitting said at least one broadcasting message on a basis of information relating to a recurrence of the polling messages transmitted by the terminals of the group;

before transmitting said at least one broadcasting message, transmitting a response message by the access network in response to each polling message received from a terminal belonging to the group on a point-to-point connection to said terminal, the response message comprising one or more parameters relating to a transmission of said at least one broadcasting message, the response message being transmitted such that the response message is received by said terminal during a listening window with a predetermined duration following the transmission of said each polling message; and transmitting, by the access network, said at least one broadcasting message over the broadcasting channel at the instant determined for transmitting.

2. The method of claim 1, wherein the response message transmitted to said terminal of the group comprises one or more following parameters:

information relating to the instant determined for transmitting said at least one broadcasting message;

a group identifier dynamically assigned by the access network;
a center frequency of the broadcasting channel; and
when a plurality of broadcasting messages is broadcasted sequentially, at least one of following: a sequence number of a first broadcasting message, a sequence number of a last broadcasting message, and a number of broadcasting messages.

3. The method of claim 1, wherein information relating to the recurrence of the polling messages transmitted by the terminals of the group is a maximum time interval separating two polling messages transmitted by said terminal of the group.

4. The method of claim 1, wherein determining the instant for transmitting the broadcasting message comprises determining a minimum waiting period for receiving at least one polling message from each terminal of the group, the instant for transmitting the broadcasting message being determined to be after an expiry of the minimum waiting period.

5. The method of claim 1, further comprising selecting, by the access network, a set of base stations of the access network contributing to the transmission said at least one broadcasting message, as a function of the polling messages received by the terminals of the group.

6. The method of claim 5 wherein a base station of the access network is selected to transmit said at least one broadcasting message only if a number of polling messages received by said base station from the terminals of the group is higher than a predetermined threshold.

7. An access network of a wireless communication system comprising:
a plurality of base stations configured to exchange messages with terminals of the wireless communication system;
the terminals being configured to transmit polling messages on an uplink to the access network in a recurrent manner and asynchronously with respect to the access network;
the access network being configured to transmit at least one broadcasting message to a group of terminals over a broadcasting channel, wherein the said access network is configured to:
determine an instant for transmitting said at least one broadcasting message on a basis of information relating to a recurrence of the polling messages transmitted by the terminals of said group;
before transmitting said at least one broadcasting message, transmit a response message in response to each polling message received from a terminal belonging to said group on a point-to-point connection to said terminal, the response message comprising one or more parameters relating to a transmission of said at least one broadcasting message, the response message being transmitted such that the response message is received by said terminal during a listening window with a predetermined duration following the transmission of said each polling message; and
transmit said at least one broadcasting message over the broadcasting channel at the instant determined for transmitting.

8. The access network of claim 7, wherein a response message transmitted to said terminal of the group comprises one or more following parameters:
information relating to the instant determined for transmitting the broadcasting message;
a group identifier dynamically assigned by the access network;
a center frequency of the broadcasting channel; and
when a plurality of broadcasting messages is broadcasted sequentially, at least one of the following: a sequence number of a first broadcasting message, a sequence number of a last broadcasting message, and a number of broadcasting messages.

9. The access network of claim 7, wherein the instant for transmitting the broadcasting message is determined as a function of a minimum waiting period for receiving at least one polling message from each terminal of the group.

10. The access network of claim 7, further configured to select a set of base stations of the access network contributing to the transmission of aid at least one broadcasting message, as a function of the polling messages received by the terminals of the group.

11. A wireless communication system comprising:
a terminal of interest;
an access network comprising a plurality of base stations configured to exchange messages with the terminal of interest;
the terminal of interest being configured to transmit a polling message on an uplink to the access network in a recurrent manner and asynchronously with respect to the access network,
the access network being configured to transmit at least one broadcasting message, over a broadcasting channel, to a group of terminals to which the terminal of interest belongs,
wherein the terminal of interest is configured to receive a response message on a point-to-point connection with the access network, during a listening window with a predetermined duration following the transmission of the polling message, the response message comprising at least one of: information relating to an instant for transmitting said at least one broadcasting message, and when a plurality of broadcasting messages is broadcasted sequentially, information to determine a set of sequence numbers intended for the terminal of interest.

12. The wireless communication system of claim 11, wherein the response message comprises the information relating to the instant for transmitting said at least one broadcasting message; and wherein the terminal of interest is configured to start listening to the broadcasting channel to receive said at least one broadcasting message based on the instant for transmitting.

13. The wireless communication system of claim 11, wherein the response message comprises the information to determine a set of sequence numbers intended for the terminal of interest; and wherein the terminal of interest is configured to consider only the broadcasting messages associated with a sequence number in the set of sequence numbers.

* * * * *